(12) United States Patent
Bao (10) Patent No.: US 6,319,068 B1
(45) Date of Patent: Nov. 20, 2001

(54) HOUSING FOR RECEPTACLE CONNECTOR AND MOLD FOR MOLDING THEREOF

(75) Inventor: Xian Dong Bao, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/603,794

(22) Filed: Jun. 26, 2000

(30) Foreign Application Priority Data

Mar. 31, 2000 (TW) .............................................. 89205286 U (51) Int. Cl.⁷ ...................................................... H01R 13/64
(52) U.S. Cl. ............................................ 439/660; 439/680
(58) Field of Search ................................... 439/660, 680, 439/681

(56) References Cited

U.S. PATENT DOCUMENTS

| | | | | |
|---|---|---|---|---|
| 5,030,130 | * | 7/1991 | Natsume | 439/374 |
| 5,221,217 | * | 6/1993 | Oikawa | 439/374 |
| 5,380,225 | * | 1/1995 | Inaoka | 439/660 |
| 5,584,721 | * | 12/1996 | Taniuchi et al. | 439/680 |
| 5,667,393 | * | 9/1997 | Grabbe et al. | 439/660 |
| 5,865,651 | * | 2/1999 | Dague et al. | 439/680 |
| 5,921,787 | * | 7/1999 | Pope et al. | 439/660 |
| 5,971,809 | * | 10/1999 | Ho | 439/660 |

* cited by examiner

*Primary Examiner*—Gary Paumen
(74) *Attorney, Agent, or Firm*—Wei Te Chung (57) ABSTRACT

An insulative housing (30) for a receptacle connector which is used for mating with a corresponding plug comprises: a base (38), a first sidewall (31), a second sidewall (32), and a pair of flanks (33) extending upward from the sides and ends of the base. A tongue (34) extends upward from a center of the base and is positioned between the first and second sidewall. The tongue defines a plurality of channels (37) in its outer sides, said channels extending through the base for receiving a plurality of terminals therein. A port (321) is defined between the sidewalls and the flanks for receiving the plug. Manufacture of the housing employs a mold assembly (4) comprising a lower mold (40), an upper mold (41) and a core (42) fitted together, with a plurality of baffles (43, 43') being inserted between the upper mold and the core (4) to form grooves (310, 320) of the sidewalls. The design of the mold assembly (4) and the placement of the baffles results in a more equal filling rate of the cavities forming the first and second sidewalls and the tongue, with the net result being less stress concentration in the tongue, and thus less warpage and deformation of the tongue.

1 Claim, 8 Drawing Sheets

HOUSING FOR RECEPTACLE CONNECTOR AND MOLD FOR MOLDING THEREOF

BACKGROUND OF THE INVENTION

1. Field of the Invention

The present invention relates to a housing of a receptacle connector and to a mold for molding the housing, and particularly to a housing for a receptacle connector molded using an improved mold whereby a tongue of the housing for receiving terminals of the connector can be formed with highly precise dimensions and positional accuracy.

2. Description of the Prior Art

Figure 7:
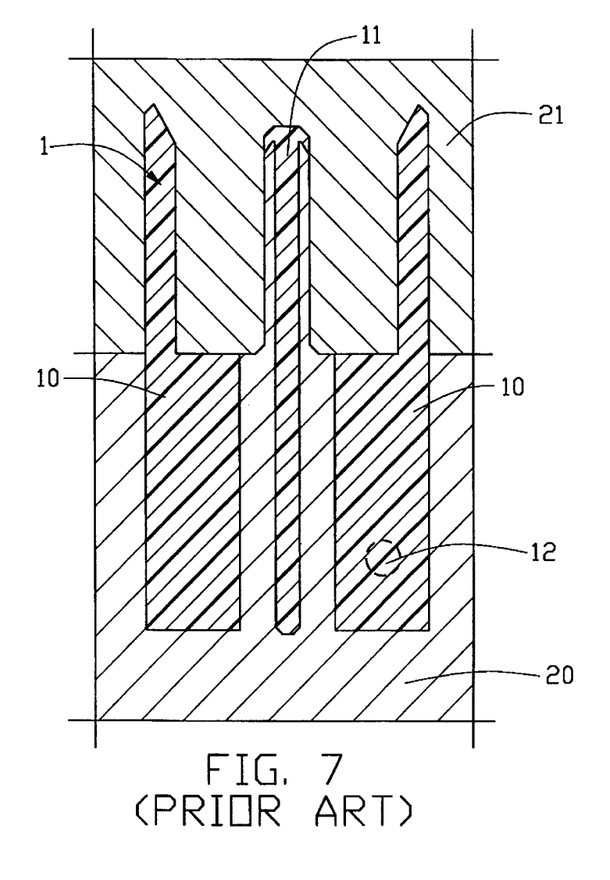
FIG. 7 is a cross-sectional view of a set of molds for forming a housing of a conventional receptacle connector with the conventional receptacle connector formed therein.
Figure 8:
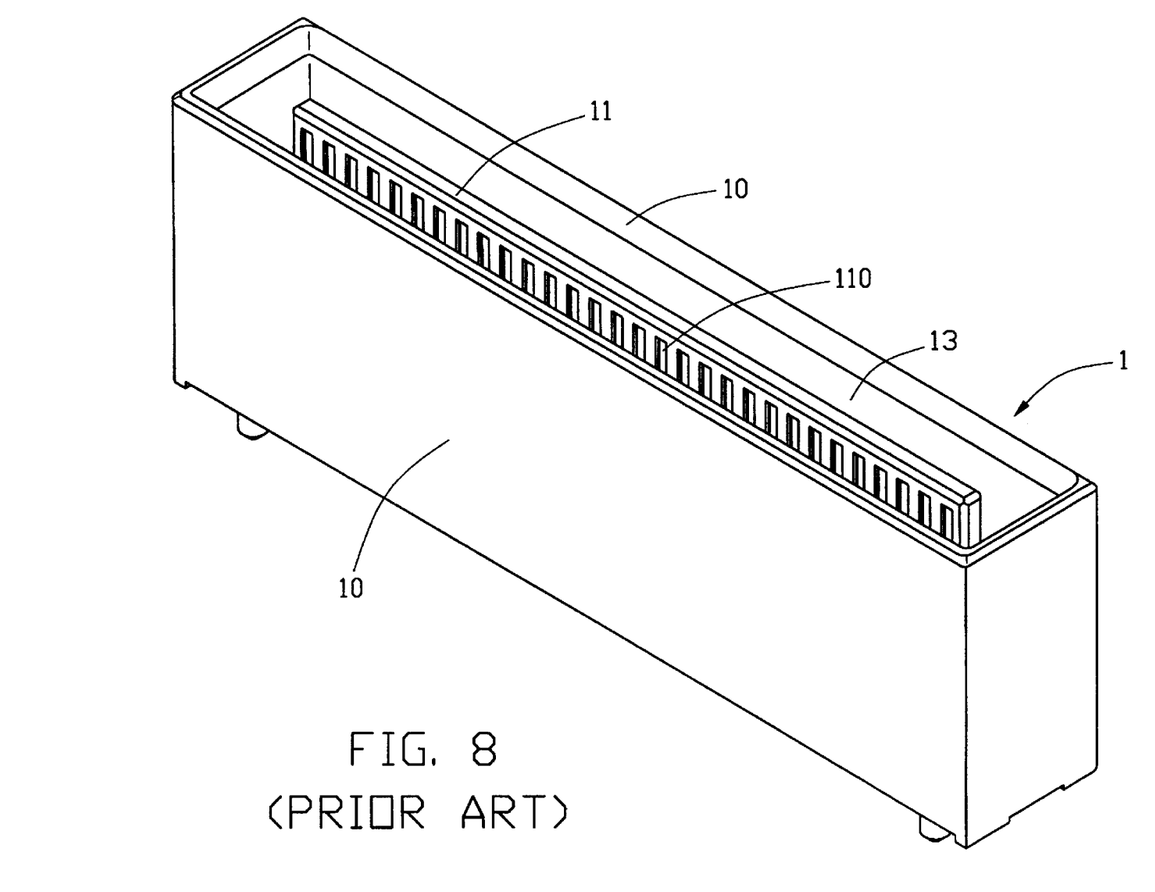
FIG. 8 is a perspective view of the housing of FIG. 7.

Referring to FIGS. 7–8, a conventional receptacle connector is often used to connect a plug (not shown) with a PCB (not shown). In general, this type of receptacle connector includes an insulative housing 1 and a plurality of terminals received in the housing 1. The insulative housing 1 comprises two sidewalls 10 parallel to each other and defining a port 13 therebetween, and a tongue 11 located between the two sidewalls 10, a plurality of grooves 110 being located in both surfaces (not labelled) of the tongue 11 for receiving a plurality of terminals (not shown). When the receptacle connector connects with the plug, outer faces of sidewalls of the plug matingly slide along inner faces of the sidewalls 10 to enter the port 13 so that contacts in inner faces of the sidewalls of the plug can precisely engage with the terminals of the receptacle connector.

In molding the insulative housing 1, plastic material is injected into a mold 20, 21 (see FIG. 7) from an injecting inlet 12. Because the plastic material does not flow into all parts of the mold at the same time, in general, the tongue 11 is completely formed after the sidewalls are complete. Thus, thermal stress can concentrate in the tongue 11, which can result in deformation, deflection, and distortion in the tongue. When any of these happens, the receptacle connector can no longer reliably connect with the plug, especially in a vibration environment. Hence, an improved mold for molding a housing of a receptacle connector and a housing of a receptacle connector having more precise dimensions and positional accuracy, are required to overcome the disadvantages of the prior art.

BRIEF SUMMARY OF THE INVENTION

A first object of the present invention is to provide a housing of a receptacle connector having highly precise dimensions and positional accuracy so that contacts of the connector can be correctly positioned in the connector.

A second object of the present invention is to provide a mold for molding a housing of a receptacle connector whereby the degree of deformation, distortion, and deflection of a contact bearing tongue of the connector is diminished.

An insulative housing for a receptacle connector in accordance with the present invention, comprises: a base, a first sidewall and a second sidewall both extending upward from the sides of the base, two flanks extending upward from ends of the base and joining the first sidewall and the second sidewall, a port being defined between the sidewalls and the flanks, and a tongue extending upward from the base and positioned between the first sidewall and the second sidewall, wherein the tongue defines a plurality of channels on each of opposite sides thereof for receiving a corresponding plurality of terminals therein.

A method of molding an insulative housing in accordance with the present invention, comprises the steps of: providing a lower mold for forming the base of the insulative housing, providing an upper mold for forming the sidewalls and the flanks, providing a core for forming the tongue, assembling the lower mold, upwardly, and core together while setting a plurality of baffles inside said molds and core, holding these baffles in place adjacent to walls thereof which will form inner surfaces of the first sidewall and the second sidewall in the finished housing, and injecting plastic material into the molds and core from an injecting inlet located at a face of the base to form the insulative housing.

A mold assembly for molding an insulative housing in accordance with the present invention, comprises: a lower mold, an upper mold, a core, and a plurality of baffles. The lower mold defines a first cavity section for forming a base of the housing and includes an injecting inlet for molten plastic material to enter into the mold. The upper mold defines a second cavity section for forming first and second sidewalls and flanks of the housing projecting upwardly from the base, and a core defines a third cavity section for forming a tongue projecting upwardly from the base and located between the first and second sidewalls. A plurality of pins project upward from the lower mold into the third cavity section for forming a plurality of channels to receive a corresponding number of terminals in the tongue. The baffles are set in the first and second cavity sections adjacent to walls of the core which form inside surfaces of the first and second sidewalls in the finished housing. The baffles form grooves in the first and second sidewalls when the housing is formed using the mold assembly. The baffles also can be used for reducing the speed at which the molten material fills the portion of the second cavity section for forming the first and second sidewalls, thereby preventing warpage in the tongue.

Other objects, advantages and novel features of the invention will become more apparent from the following detailed description of the present embodiment when taken in conjunction with the accompanying drawings.

DETAILED DESCRIPTION OF THE INVENTION

Figure 1:
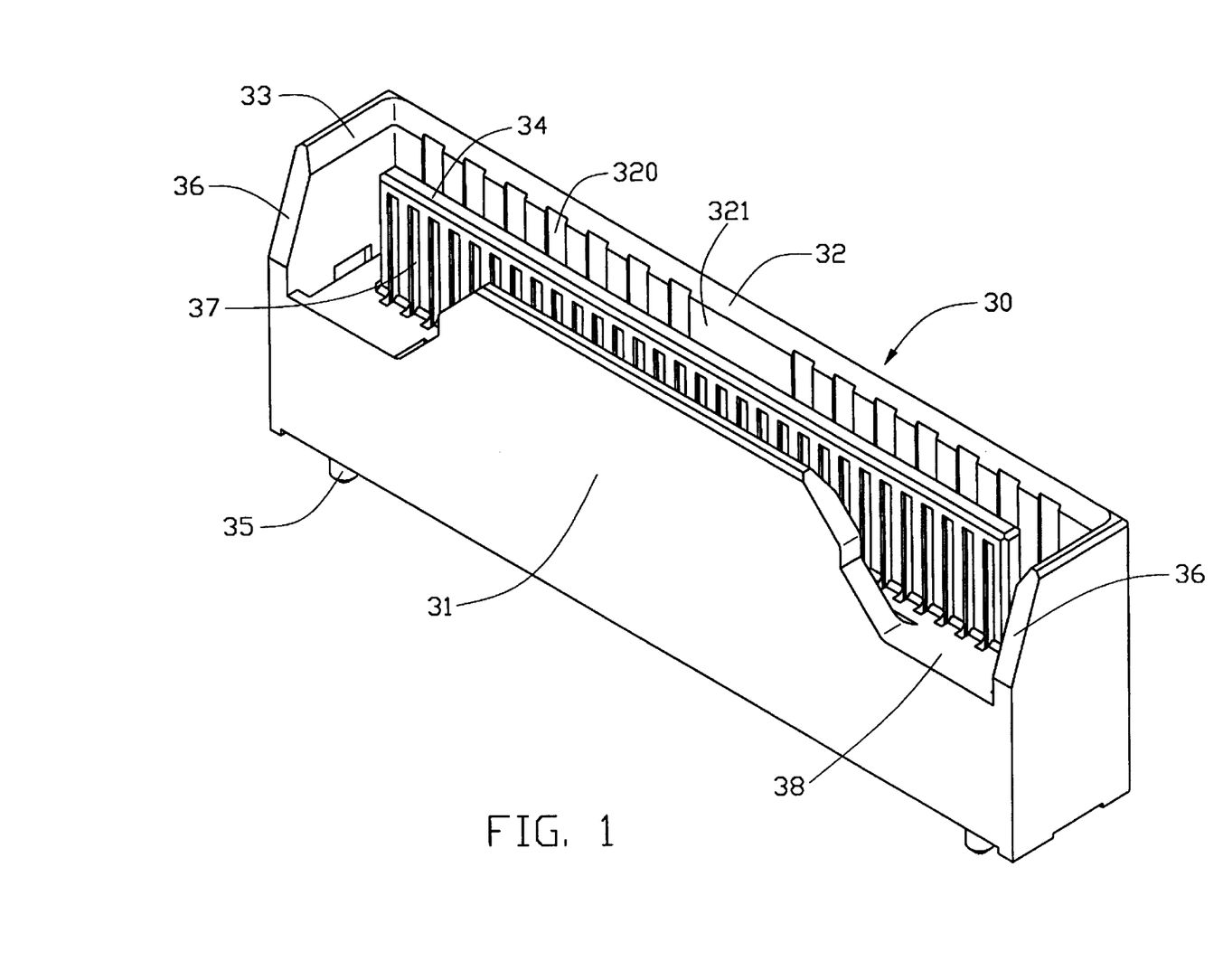
FIG. 1 is a perspective view of a housing of a receptacle connector in accordance with the present invention.

Referring to FIG. 1, an insulative housing 30 of a receptacle connector in accordance with the present invention, comprises a base 38, a first sidewall 31 and a second sidewall 32 extending upward from the sides of the base 38, and two flanks 33 extending upward from the ends of the base 38. The second sidewall 32 is integrally connected to the two flanks while the first sidewall 31 is spaced from the two flanks 33 without interconnection therebetween. The first sidewall 31, the second sidewall 32 and the flanks 33 cooperatively define a plug connector receiving port 321 therebetween. A tongue 34 extends upwardly from the base 38 into the port 321 to retain terminals of the receptacle connector therein.

Figure 2:
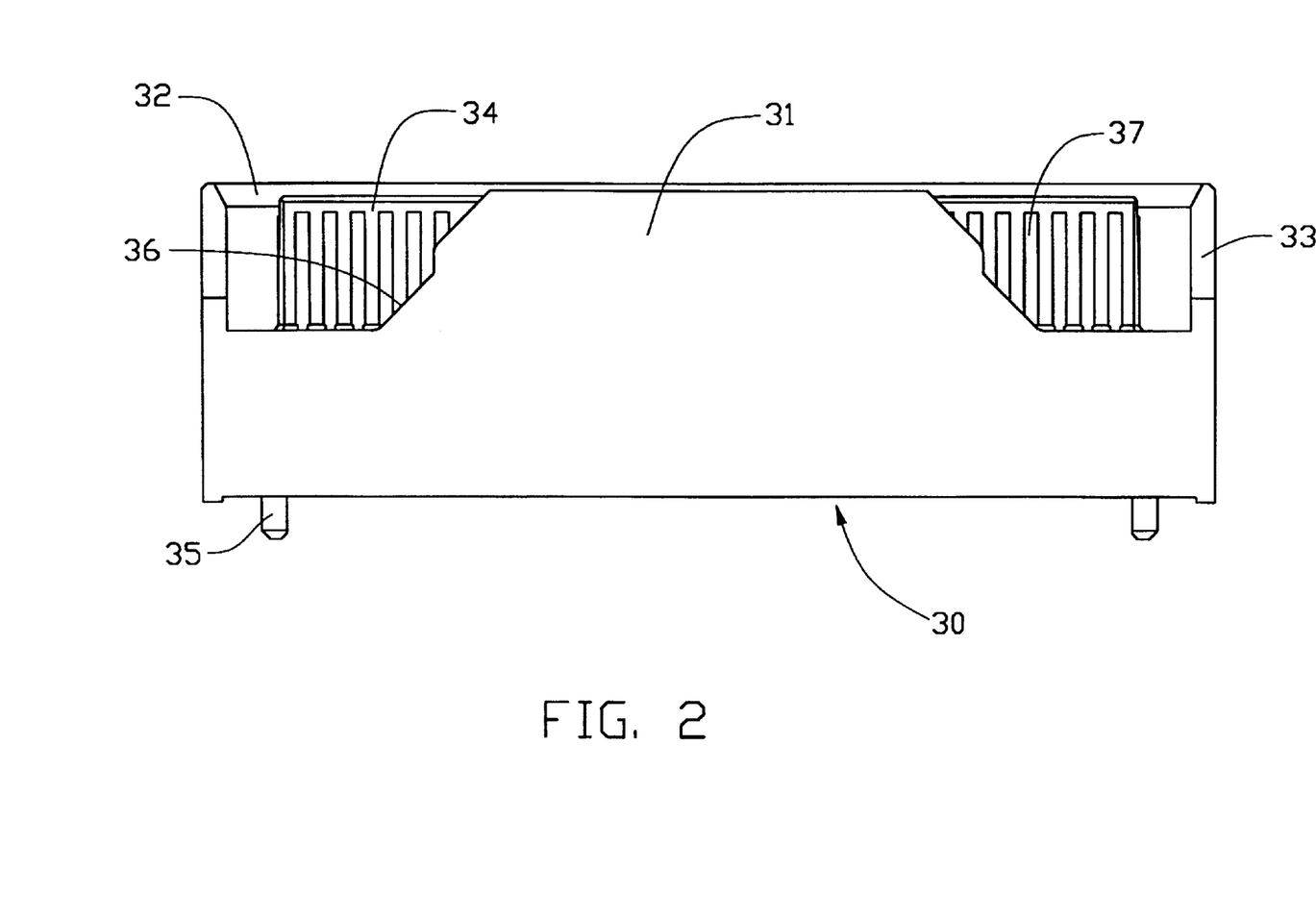
FIG. 2 is a side view of the housing of FIG. 1.
Figure 3:
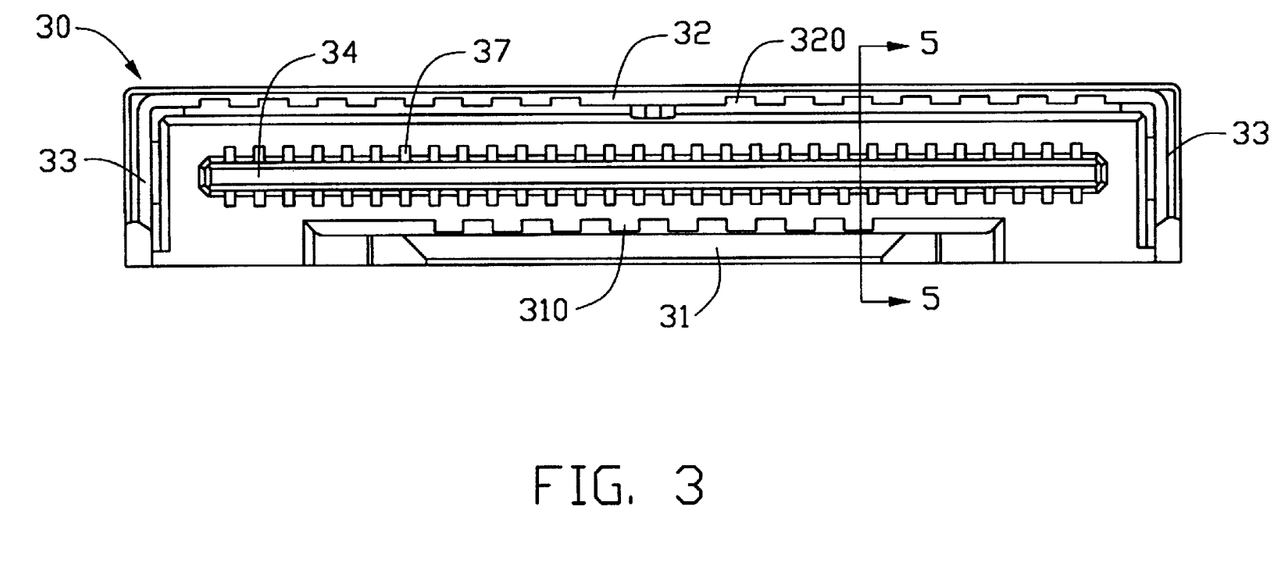
FIG. 3 is top view of the housing of FIG. 1.

Referring to FIGS. 1–3, a pair of positioning posts 35 depend downwardly from the base 38 adjacent each flank 33 to aid in positioning the housing 30 on a printed circuit board (not shown). In addition, a pair of polygonal gaps 36 is defined in the first sidewall 31 and in each of the flanks 33. When a corresponding plug is inserted into the insulative housing 30, each gap 36 engages with a corresponding projection on the plug for polarization during mating.

The base 38 defines a slot 380 (see FIG. 5) adjacent the second sidewall 32. Referring to FIG. 3, a plurality of first grooves 310 are defined in an inner surface of the first sidewall 31 and a plurality of second grooves 320 are defined in an inner surface of the second sidewall 32, wherein these grooves 310, 320 each have a rectangular shape. The tongue 34 defines a plurality of channels 37 positioned on both sides thereof (see FIG. 5) and extending through the base 38 (see FIG. 1) to retain the terminals therein.

Figure 4:
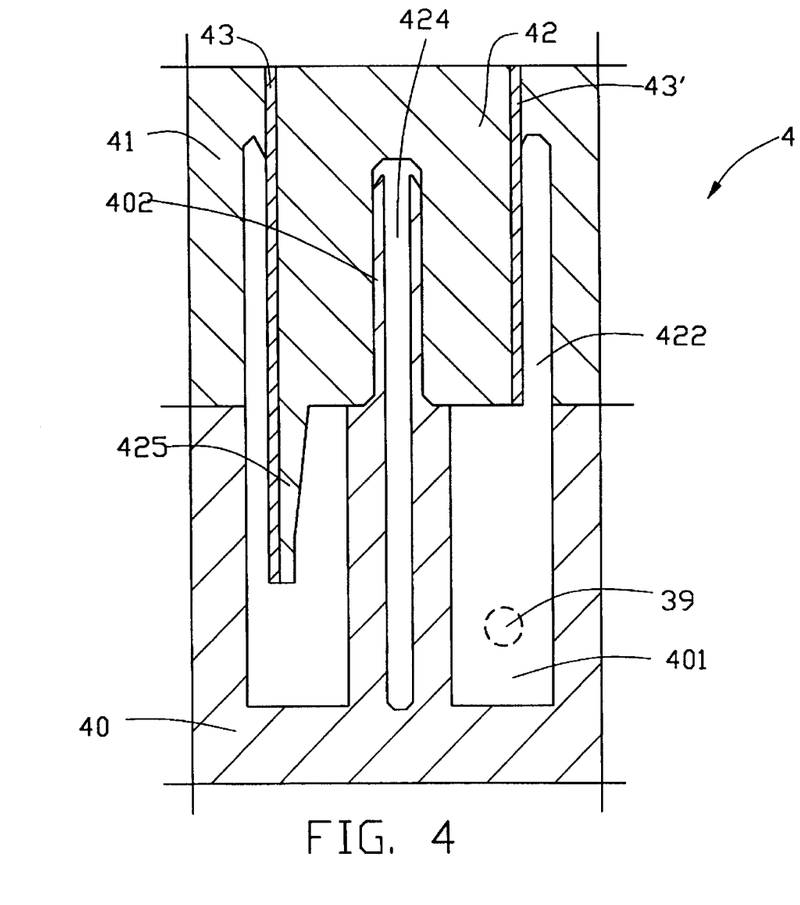
FIG. 4 is a cross-sectional view of a set of molds for forming the housing of FIG. 1.
Figure 5:
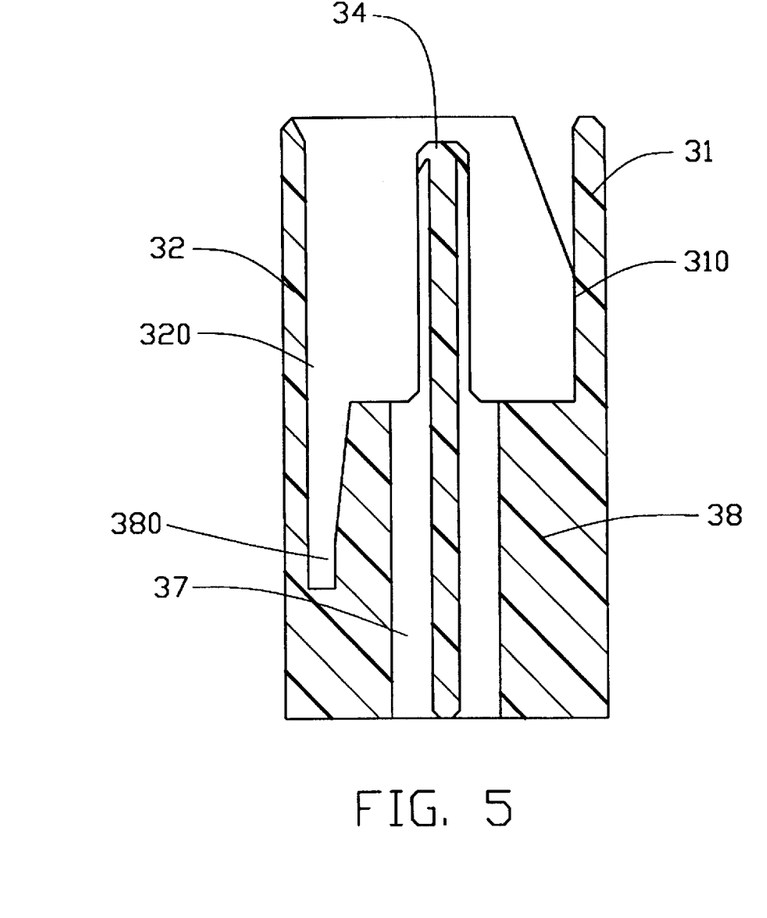
FIG. 5 is a cross-sectional view of the housing of FIG. 1 taken along line 5—5 of FIG. 3.
Figure 6:
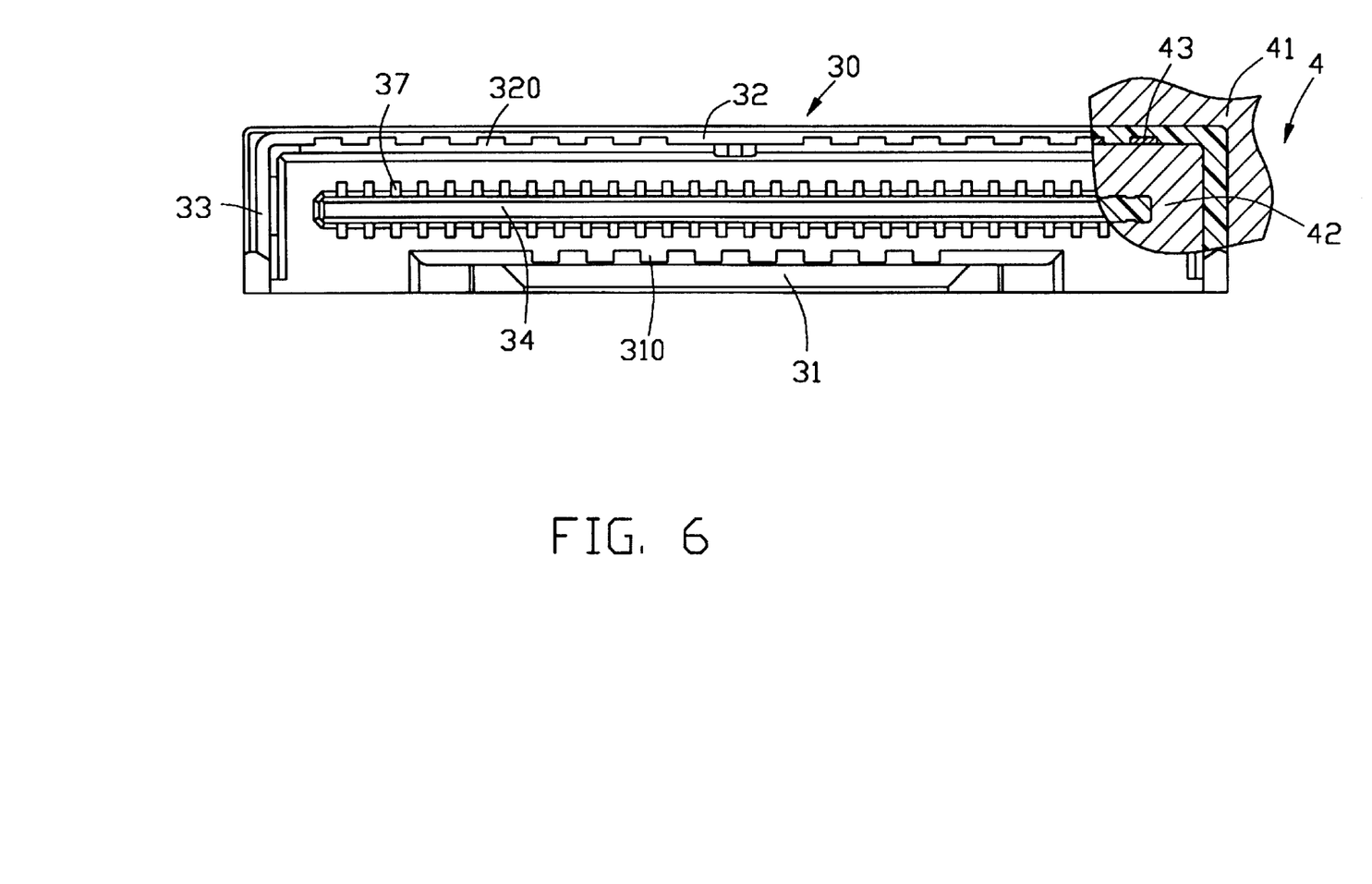
FIG. 6 is the view of FIG. 3 including a partial top cross-sectional view of the mold of FIG. 4 and the housing therein.

Referring to FIGS. 4–6, a mold assembly 4 for molding this insulative housing 30 comprises an upper mold 41, a lower mold 40, a core 42 and a plurality of baffles 43, 43'. An injecting inlet 39 is defined in one side of the lower mold 40 so as to provide an entrance for injecting material.

The lower mold 40 is provided with a first cavity section 401 for forming the base 38 of the housing 30. The lower mold 40 further has a plurality of pins 402 extending upwardly for forming the channels 37 for receiving the terminals. The upper mold 41 is provided with a second cavity section 422 for forming the first and second sidewalls 31, 32 and the flanks 33. The core 42 is provided with a third cavity section 424 for forming the tongue 34. The pins 402 extend into the third cavity section 424. The core 42 has a projection 425 extending downwardly into the first cavity section 401 for forming the slot 380.

The baffles 43, 43' are inserted through the upper mold 41 into the first and second cavity sections 401, 422 and are located adjacent the core 42, in the cavities wherein the first sidewall 31 and the second sidewall 32 will be formed. The long baffles 43 have an elongated length extending next to the core 42 adjacent the projection 425 where the slot 380 will be formed in the molded product. When molten plastic material is injected into the cavity sections via the injection inlet 39, the first cavity section 401 is first filled to form the base 38 of the housing 30. Due to the provision of the baffles 43, 43', the flowing of the molten material into the second cavity section 422 for forming the first and second sidewalls is slowed, which results in a slowed formation of the first and second sidewalls. By this design, more molten material is directed into the third cavity section 424 at an earlier time resulting in the filling rates of the second and third cavity sections 422, 424 being more nearly equal. Thus, the sidewalls and the tongue are formed almost simultaneously, whereby thermal stress concentrations in the tongue due to delayed formation of the tongue is mitigated over the prior art. Diminishing the thermal stresses in the tongue 34 accordingly improves the dimensional precision of the tongue and associated terminal receiving channels 37. Thus, when the terminals of the connector are mounted in the tongue 34 of the housing 30, the terminals are secured at their correct positions so that they reliably mate with the contacts of a mating plug connector.

After the molding process, the first grooves 310 are formed on the inner surface of the first sidewall 31 and the second grooves 320 are formed on the inner surface of the second sidewall 32 by the baffles 43', 43, respectively. In summary, the structure of the grooves 310, 320 can increase the planarity of the tongue 34, which is helpful to assure reliable signal transfer between connectors.

A method for molding a housing 30 of a receptacle connector of the present invention, comprises the steps of: providing a mold assembly comprising: a lower mold for forming the base of the insulative housing; an upper mold for forming the sidewalls and the flanks of the housing; a core for forming the tongue of the housing; and a plurality of baffles; fitting the mold assembly together with the plurality of baffles being positioned between the core and the upper mold, adjacent outer surfaces of the core for forming a plurality of grooves in inner surfaces of the sidewalls; and injecting plastic material into the mold assembly from an injecting inlet located in an end wall of the lower mold at a face of the base to form the insulative housing.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An insulative housing for a receptacle connector which is used for mating with a corresponding plug connector, comprising:

a base;

a first sidewall and a second sidewall both extending upwardly from an upper surface of the base, a plurality of grooves being defined on an inward side of the first sidewall and the second sidewall, respectively;

two flanks extending upwardly from the upper surface of the base and incorporating the first sidewall and the second sidewall, respectively a port being defined by the sidewalls and the flanks for receiving the plug; and a tongue extending upwardly from the upper surface of the base and positioned between the first sidewall and the second sidewall, the tongue defining a plurality of channels in outer sides thereof, said channels extending through the base for receiving a corresponding plurality of terminals therein;

wherein a pair of posts extend downwardly from a lower surface of the base adjacent the flanks for positioning the insulative housing on a printed circuit board;

wherein a pair of polygonal gaps are defined in each of the first sidewall and the flanks for polarization;

wherein the base defines a slot through the upper surface within the port adjacent the second sidewall.

* * * * *